C. O. J. MONTELIUS.
METHOD AND APPARATUS FOR THE TRANSFORMING OF ELECTRICAL ENERGY.
APPLICATION FILED APR. 11, 1918.
1,319,164.
Patented Oct. 21, 1919.
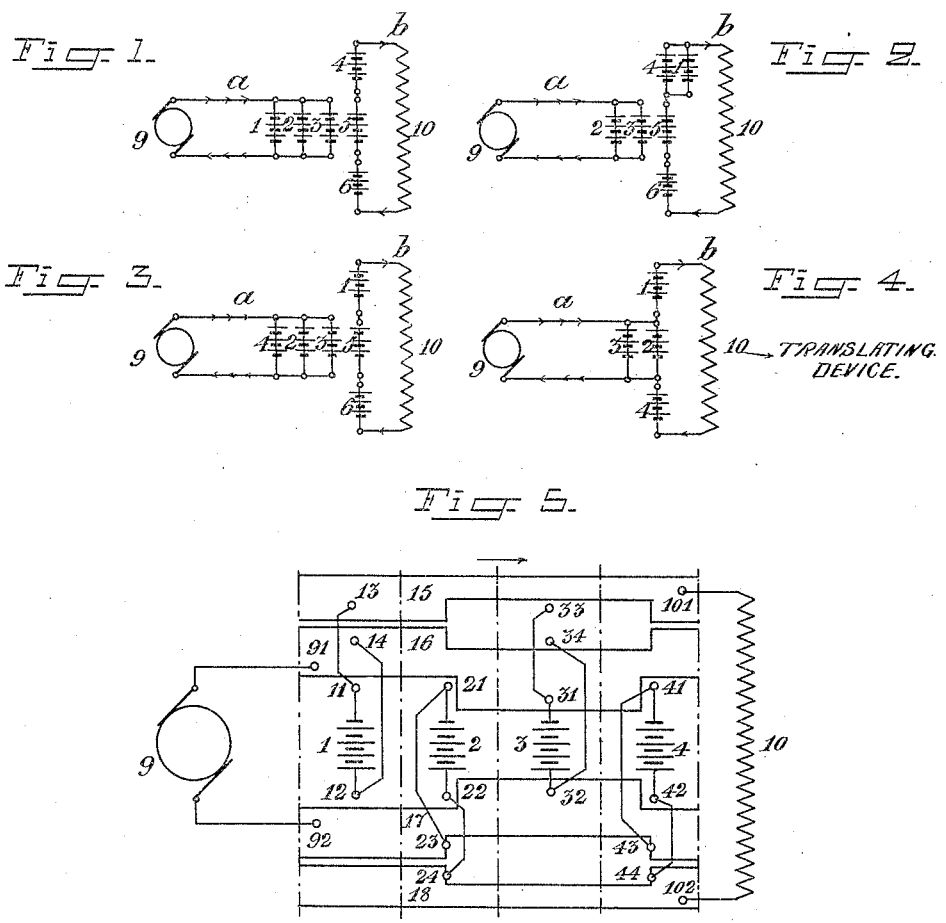
Inventor:
C. O. J. Montelius.
by H. R. Kerslake
Attorney

UNITED STATES PATENT OFFICE.

CARL OSCAR JOSEF MONTELIUS, OF STOCKHOLM, SWEDEN.

METHOD AND APPARATUS FOR THE TRANSFORMING OF ELECTRICAL ENERGY.

1,319,164.   Specification of Letters Patent.   Patented Oct. 21, 1919.

Application filed April 11, 1918.  Serial No. 228,022.

*To all whom it may concern:*

Be it known that I, CARL OSCAR JOSEF MONTELIUS, subject of the King of Sweden, residing at 18 Östermalmsgatan, Stockholm, Sweden, have invented certain new and useful Improvements in Methods and Apparatus for the Transforming of Electrical Energy, of which the following is a specification.

The invention refers to systems of transferring electrical energy from a primary electrical circuit to a secondary using storage cells or similar apparatus, and more particularly to systems of this kind in which the cells are alternatey shifted from the primary to the secondary circuit and vice versa by means of a continuously operating switching device, the cells being charged in the primary and discharged in the secondary circuit.

The invention embodies the use of electrolytic condensers or polarization cells which hitherto have found no practical use for storing electrical energy on account of their small capacity. A simple electrolytic condenser or polarization cell, notwithstanding its small capacity, as compared with that of an ordinary electrical storage battery cell is capable of receiving or delivering a considerable power although only during a short time. The present invention allows of the time of charging or discharging being diminished to the degree wanted, the possible speed of the switching device being the sole limit.

An important feature of the invention has reference to the transformation efficiency which in a method according to the present invention is considerably higher than in any method using storage battery cells in the known manner, as will appear from the following exposition.

As well known, the electromotive force of an electrolytic cell is a function of the concentration of the ions at the electrode and the concentration of the ions in the electrolyte according to the formula $$P = RT \log \frac{c_1}{c_2}$$

in which R is a constant, T the absolute temperature and $C_1$ and $C_2$ the concentration of the ions at the electrode and in the electrolyte close to the electrode respectively.

In charging and discharging ordinary storage cells said concentrations $C_1$ and $C_2$ are subjected to changes causing corresponding variations of the electromotive force P. As, usually, $C_1$ is considerably greater than $C_2$, $C_1$ will vary much slower than $C_2$, the latter reaching quickly the limit value at which the diffusion within the electrolyte is in equilibrium with the rate of charge or discharge. The electromotive force is thereby raised or lowered correspondingly, till it reaches a stationary value. Thus, the variation of the ion-concentration within the electrolyte causes a drop of voltage which owing to the loss of energy connected therewith has an unfavorable effect on the efficiency of the cell.

According to the present invention, however, the charging and discharging periods are shortened so as not to allow the concentration of the ions of the electrolyte ($C_2$) to reach its limit values, the loss of energy being consequently smaller and, thus, the efficiency higher.

When using short periods of charge and discharge the ion-concentration of the electrolyte ($C_2$) will, therefore, vary within said limits while the ion-concentration of the electrode ($C_1$), which is changing very slowly, may be considered as practically constant. In charging and discharging ordinary storage cells, when the time of charge or discharge amounts to one or more hours, the condition is chiefly reversed, as in this case $C_2$ reaches its limit value at the beginning of the charge or discharge while $C_1$ is varying even after $C_2$ has become stationary. Thus, in using short periods of charge and discharge chiefly only the capacity of the electrolyte is of importance with regard to the working of the cells, while in case of using relatively long periods of charge and discharge only the capacity of the electrodes is of importance in that respect.

Storage cells used according to the present invention may therefore be provided with simple electrodes having no active mass. If any active mass at all is used, it may be applied to the surface of the electrodes in a very thin layer the capacity of this active mass serving only as a reserve in case of a disturbance in the supply of current or as a help during the peak load.

The invention is illustrated in the accompanying drawing. The Figures 1–3 elucidate the principle of the invention and show three different stages of the switching operation. Fig. 4 shows a modification of the connections shown in Figs. 1–3 and Fig. 5 shows a part of a switching apparatus working according to Fig. 4.

In the Fig. 1 the numbers 1, 2, 3 indicate three groups of cells, each consisting of an arbitrary number of storage or polarization cells. These groups are connected in parallel in a primary circuit *a* including a generator 9. The secondary circuit *b* includes three similar groups of cells 4, 5 and 6 connected in series with a motor or other current consuming apparatus 10. By means of a continuously rotating switching device the cell groups 1—6 are alternately shifted from the primary to the secondary circuit and reversely in the following manner: Proceeding from the switching stage indicated in Fig. 1, in the next moment the cells are shifted as shown in Fig. 2, where the cell group 1 is disconnected from the primary circuit and connected to the secondary circuit in parallel to the group 4. In the next moment a new change is made as shown in Fig. 3 where the group 4 is disconnected from the secondary circuit and connected to the primary circuit in parallel to the other cell groups. Thus the two cell groups 1 and 4 have changed their places. Subsequently, a similar shifting of the cell groups 2 and 3 is effected, these groups being transferred in their turn to the secondary circuit and replaced by the cell groups 5 and 6. The described course of operation is then repeated. In this manner recharged cell groups are continuously transferred from the primary to the secondary circuit and the discharged cells are brought back to the primary circuit. It is obviously possible to obtain any proportion between the primary and secondary voltages by choosing the number of cells per group and the number of groups in a suitable manner. The complete apparatus consisting of the cell groups and the switching device thus constitutes a sort of transformer by means of which direct current energy may be transferred from one circuit to another while changing the potential.

A plurality of cell groups may be transferred in the same moment without any interruption of the current if in both the secondary and in the primary circuits two or more series of cell groups such as 4, 5, 6, Fig. 1, are connected in parallel.

In case it is not necessary to use quite separate primary and secondary circuits, these circuits may be connected as indicated in Fig. 4, showing the same transformer ratio as in Figs. 1–3. In this way one-third of the number of cell groups are saved as compared with the arrangement in Figs. 1–3.

Fig. 5 is a diagram showing the circuit connections in an apparatus for the same transformer ratio as in Fig. 4. The shaft of the controller is motor-driven and has four contact rings 15, 16, 17 and 18. The poles of the generator 9 are connected to the rings 16 and 17 through the contact pieces 91 and 92 and the contact rings 15 and 18 are connected with the power consuming apparatus 10 by the contact pieces 101 and 102. The four cell groups 1, 2, 3 and 4 have their poles connected to the contact pieces 11, 12, 13 and 14, 21, 22, 23 and 24, 31, 32, 33 and 34, 41, 42, 43 and 44 correspondingly as shown in the figure. The rings of the controller are moved from the right to the left. In the position shown in Fig. 5 only the group indicated by 3 is charged, the groups 1, 2 and 4 being connected for discharge. Both the groups 2 and 4 which in this moment are connected in parallel are in the position where the group 2 has just been switched from charging to discharging connection and the group 4 will in the next moment be switched from discharging to charging connection.

In Fig. 5 the contact pieces are indicated as consisting each of a single piece. In some cases it may be practical to use two contact pieces at every contact point and to make an arrangement to regulate the distance between these pieces. It is possible by this means to regulate the proportion between the length of the charging and discharging periods.

The invention described has important advantages as regards regulation of the voltage of the secondary circuit. This may be effected in two ways, either through a variation of the speed of the controller or through a change in the proportion between the periods of charge and discharge. If the speed of the controller is diminished, the voltage of the secondary circuit will be reduced. This fact may also be utilized in order to cut down the current slowly before the switching off of the load. It is well known that the breaking of a high tension direct circuit is difficult. Through the invention here described this difficulty is evaded, if before the breaking of the circuit the speed of the controller is slowed down or the controller is brought to a standstill. The voltage of the secondary circuit will then rapidly decrease, thus enabling an easy circuit-breaking. If the second method of regulating the voltage is used, the voltage is lowered by decreasing the period of charge and increasing correspondingly the period of discharge.

When the load in the secondary circuit is small or none, the speed of the controller may be kept low without any considerable change in the voltage of discharge, but the greater the secondary load, the shorter the periods of charge and discharge. It is, evidently, practical to lessen this speed at small loads to avoid too great a wear of the controlling apparatus.

It is also practical first to switch the new group of cells in parallel to the cells to be shifted before making this shifter. In order to prevent sparking during the switching operation the sum of the electromotoric forces of the self-induction and the ohmic voltage drops at a certain speed should be made to correspond with the variation of voltage in a switching period. In this case the voltage of the group of cells just switched off must be equal to the E. M. F. of the working parallel group of cells with the addition of these self-induction and ohmic resistance drops.

Having now described my invention what I claim is:—

1. The method of transforming electrical energy by means of storage cells or similar apparatus which are charged in a primary circuit and discharged in a secondary circuit, consisting in shifting said cells alternately in a certain order from the primary to the secondary circuit and vice versa by a switching device operating at such a speed that the voltages of charge and discharge lie within the limit values which said voltages should reach in other case after the ion-concentration of the electrolyte has reached a stationary value.

2. The method of transforming electrical energy by means of storage cells which are charged in a primary circuit and discharged in a secondary circuit and which are being alternately shifted from the primary to the secondary circuit and vice versa by a continuously operating switching device, the method of regulating the voltage of the secondary circuit by changing the rate of commutation.

3. The method of transforming electrical energy by means of polarization cells which are charged in a primary circuit and discharged in a secondary circuit and which are being alternately shifted from the primary to the secondary circuit and vice versa by a continuously operating switching device, the method of continuously decreasing the voltage of the secondary circuit by stopping the switching device.

4. The method of transforming electrical energy by means of storage cells or similar apparatus which are charged in a primary circuit and discharged in a secondary circuit, consisting in shifting said cells alternately from the primary to the secondary circuit and vice versa at such a rate as to cause the self-induction voltage and the ohmic voltage drop of the cell or cell group to be shifted to correspond with the variation of voltage in a switching period.

5. An apparatus for transforming electrical energy, consisting of a number of polarization cells and a rotating commutator operating to shift the cells continuously in a certain order from a primary to a secondary circuit.

6. A system for transforming electrical energy, comprising a number of electrolytic cells and a rotating commutator operating to shift the cells continuously in a certain order from a primary to a secondary circuit and vice versa without breaking the circuits, cells of one circuit forming part of the other.

In testimony whereof I affix my signature in presence of two witnesses.

CARL OSCAR JOSEF MONTELIUS.

Witnesses:
JACOB BAGGE,
OSCAR GRAHN.

Copies of this patent may be obtained for five cents each, by addressing the "Commissioner of Patents, Washington, D. C."